United States Patent
Davda et al.

(10) Patent No.: US 10,452,580 B2
(45) Date of Patent: Oct. 22, 2019

(54) METHOD AND SYSTEM FOR PROVIDING REMOTE DIRECT MEMORY ACCESS TO VIRTUAL MACHINES

(71) Applicant: VMware, Inc., Palo Alto, CA (US)

(72) Inventors: Bhavesh Davda, Fremont, CA (US); Adit Uday Ranadive, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 1933 days.

(21) Appl. No.: 13/850,966

(22) Filed: Mar. 26, 2013

(65) Prior Publication Data

US 2014/0297775 A1    Oct. 2, 2014

(51) Int. Cl.
G06F 15/16      (2006.01)
G06F 13/28      (2006.01)

(52) U.S. Cl.
CPC ..................... *G06F 13/28* (2013.01)

(58) Field of Classification Search
CPC ........................................ G06F 13/28
USPC .......................................... 709/212
See application file for complete search history.

(56) References Cited

U.S. PATENT DOCUMENTS

| | | | | |
|---|---|---|---|---|
| 2007/0288921 | A1* | 12/2007 | King | G06F 9/45537 718/1 |
| 2008/0148281 | A1* | 6/2008 | Magro | G06F 9/45533 719/314 |
| 2008/0168479 | A1* | 7/2008 | Purtell | G06F 9/45558 719/328 |
| 2012/0266018 | A1* | 10/2012 | Tanaka | G06F 11/2097 714/19 |
| 2013/0067468 | A1* | 3/2013 | Tillier | G06F 9/45541 718/1 |
| 2013/0282994 | A1* | 10/2013 | Wires | G06F 3/0604 711/158 |
| 2014/0208045 | A1* | 7/2014 | Warszawski | G06F 3/0619 711/159 |
| 2014/0280666 | A1* | 9/2014 | Cardona | H04L 67/1097 709/212 |

OTHER PUBLICATIONS

Siong, Jianxin, "SoftIB: A Virtual IB Device for Xen", Openfabrics Alliance, http://openfabrics.org.

* cited by examiner

Primary Examiner — Oscar A Louie
Assistant Examiner — Oluwatosin M Gidado (57) ABSTRACT

The current document is directed to methods and systems that provide remote direct memory access ("RDMA") to applications running within execution environments provided by guest operating systems and virtual machines above a virtualization layer. In one implementation, RDMA is accessed by application programs within virtual machines through a paravirtual interface that includes a virtual RDMA driver that transmits RDMA requests through a communications interface to a virtual RDMA endpoint in the virtualization layer.

20 Claims, 11 Drawing Sheets

METHOD AND SYSTEM FOR PROVIDING REMOTE DIRECT MEMORY ACCESS TO VIRTUAL MACHINES

TECHNICAL FIELD

The current document is directed to virtualization of computer resources and, in particular, to a method and system that provides remote direct memory access ("RDMA") to applications executing within execution environments provided by virtual machines and guest operating systems.

BACKGROUND

The development and evolution of modern computing has, in many ways, been facilitated by the power of logical abstraction. Early computers were manually programmed by slow and tedious input of machine instructions into the computers' memories. Over time, assembly-language programs and assemblers were developed in order to provide a level of abstraction, namely assembly-language programs, above the machine-instruction hardware-interface level, to allow programmers to more rapidly and accurately develop programs. Assembly-language-based operations are more easily encoded by human programmers than machine-instruction-based operations, and assemblers provided additional features, including assembly directives, routine calls, and a logical framework for program development. The development of operating systems provided yet another type of abstraction that provided programmers with logical, easy-to-understand system-call interfaces to computer-hardware functionality. As operating systems developed, additional internal levels of abstraction were created within operating systems, including virtual memory, implemented by operating-system paging of memory pages between electronic memory and mass-storage devices, which provided easy-to-use, linear memory-address spaces much larger than could be provided by the hardware memory of computer systems. Additional levels of abstractions were created in the programming-language domain, with compilers developed for a wide variety of compiled languages that greatly advanced the ease of programming and the number and capabilities of programming tools with respect to those provided by assemblers and assembly languages. Higher-level scripting languages and special-purpose interpreted languages provided even higher levels of abstraction and greater ease of application development in particular areas. Similarly, block-based and sector-based interfaces to mass-storage devices have been abstracted through many levels of abstraction to modern database management systems, which provide for high-available and fault-tolerant storage of structured data that can be analyzed, interpreted, and manipulated through powerful high-level query languages.

In many ways a modern computer system can be thought of as many different levels of abstractions along many different, often interdependent, dimensions. More recently, powerful new levels of abstraction have been developed with respect to virtual machines, which provide virtual execution environments for application programs and operating systems. Virtual-machine technology essentially abstracts the hardware resources and interfaces of a computer system on behalf of multiple virtual machines, each comprising one or more application programs and an operating system. Even more recently, the emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces.

While virtualization technologies are widely employed in many different types of computing environments, there are challenges with respect to employing virtualization technologies in high-performance computing ("HPC") and other types of computing environments that require high-bandwidth and low-latency inter-system communications. Designers, developers, manufacturers, vendors, and users of virtualization technologies therefore continue to seek virtualization technologies applicable to HPC and other computing environments with similar communications needs.

SUMMARY

The current document is directed to methods and systems that provide remote direct memory access ("RDMA") to applications running within execution environments provided by guest operating systems and virtual machines above a virtualization layer. In one implementation, RDMA is accessed by application programs within virtual machines through a paravirtual interface that includes a virtual RDMA driver that transmits RDMA requests through a communications interface to a virtual RDMA endpoint in the virtualization layer.

DETAILED DESCRIPTION

The current document is directed to methods and systems that provide remote direct memory access ("RDMA") to applications running within execution environments provided by guest operating systems and virtual machines. In one implementation, RDMA is accessed by application programs within virtual machines through a paravirtual interface. The paravirtual interface includes libraries, an RDMA stack, and a virtual RDMA driver that transmits RDMA requests through a socket-like communications interface to a counterpoint virtual RDMA interface in the VM kernel of a virtualization layer. The VM kernel multiplexes RDMA requests from one or more application programs to a host-adapter-device driver and host adapter. RDMA requests directed to local application programs are emulated by the VM kernel using shared-memory copying. The VM kernel manages state information for the host adapter and for the virtual RDMA interfaces provided to each application program so that the state information can be encapsulated in a file that is transferred to a remote computer system during migration of the virtual machine to a remote computer system. When the virtual machine is restarted on the remote computer system, the state information for the virtual RDMA interface is extracted and used by the virtualization layer on the remote computer system to re-establish the RDMA-facilitated communications connections to between the application program within the migrated virtual machine and other remote and/or local application programs. The virtual RDMA-interface state information may additionally be used for snapshot operations and other types of operations provided by the virtualization layer in which state information for a virtual machine is collected and stored by the virtualization layer.

Overview of Computer Systems and Virtualization

Figure 1:
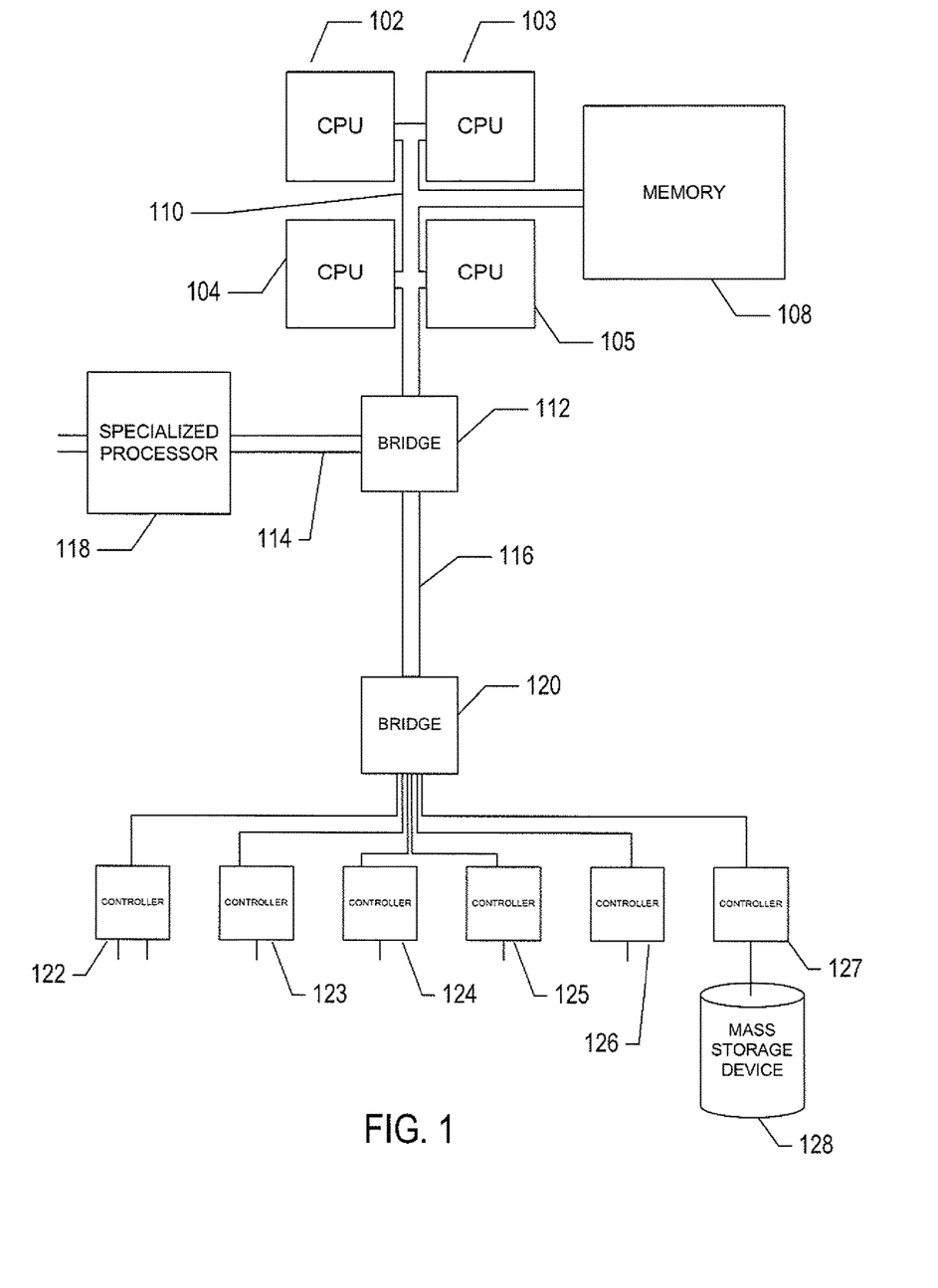
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple buses, a first bridge 112 that interconnects the CPU/memory-subsystem bus 110 with additional buses 114 and 116, or other types of high-speed interconnection media, including multiple, high-speed serial interconnects. These buses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources.

Figure 2:
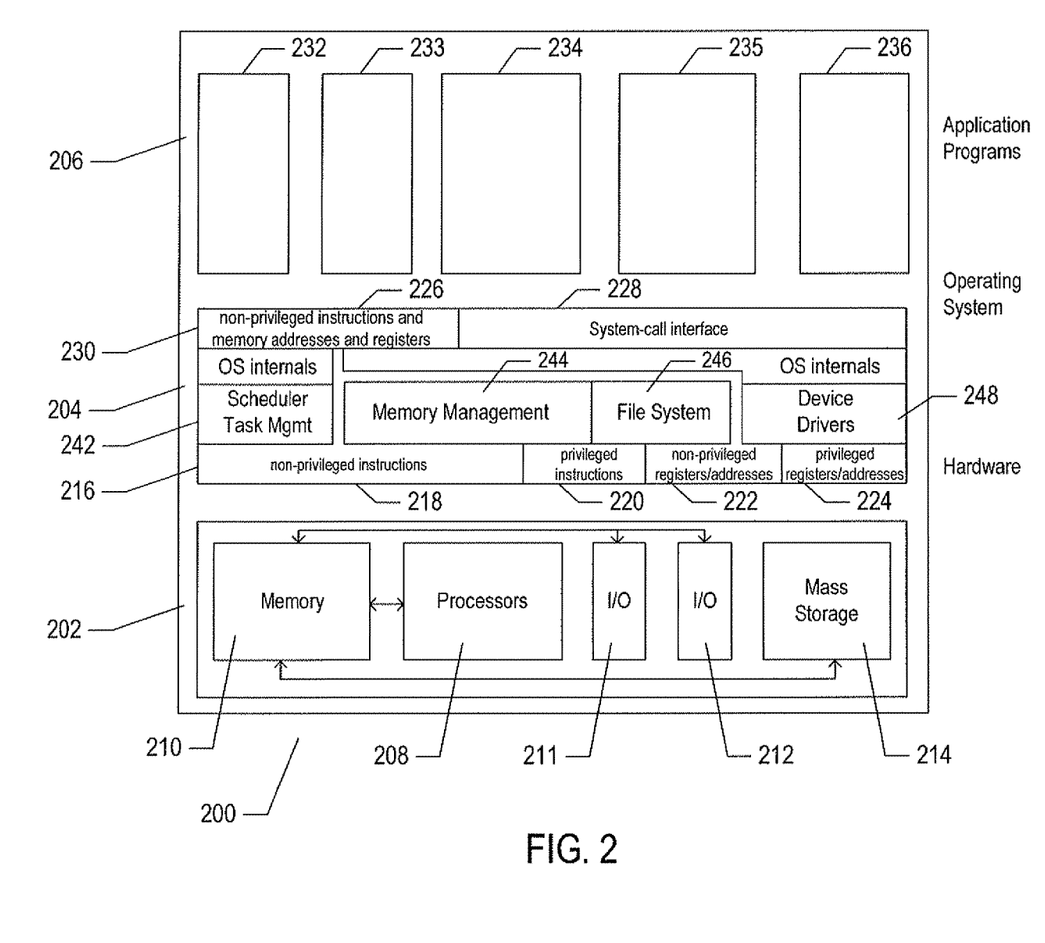
FIG. 2 illustrates generalized hardware and software components of a general-purpose computer system, such as a general-purpose computer system having an architecture similar to that shown in FIG. 1.

FIG. 2 illustrates generalized hardware and software components of a general-purpose computer system, such as a general-purpose computer system having an architecture similar to that shown in FIG. 1. The computer system 200 is often considered to include three fundamental layers: (1) a hardware layer or level 202; (2) an operating-system layer or level 204; and (3) an application-program layer or level 206. The hardware layer 202 includes one or more processors 208, system memory 210, various different types of input-output ("I/O") devices 211 and 212, and mass-storage devices 214. Of course, the hardware level also includes many other components, including power supplies, internal communications links and buses, specialized integrated circuits, many different types of processor-controlled or microprocessor-controlled peripheral devices and controllers, and many other components. The operating system 204 interfaces to the hardware level 202 through a low-level operating system and hardware interface 216 generally comprising a set of non-privileged processor instructions 218, a set of privileged processor instructions 220, a set of non-privileged registers and memory addresses 222, and a set of privileged registers and memory addresses 224. In general, the operating system exposes non-privileged instructions, non-privileged registers, and non-privileged memory addresses 226 and a system-call interface 228 as an operating-system interface 230 to application programs 232-236 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 242, memory management 244, a file system 246, device drivers 248, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The operating system scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 246 facilitates abstraction of mass-storage-device and memory resources as a high-level, easy-to-access, file-system interface. Thus, the development and evolution of the operating system has resulted in the generation of a type of multifaceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 3:
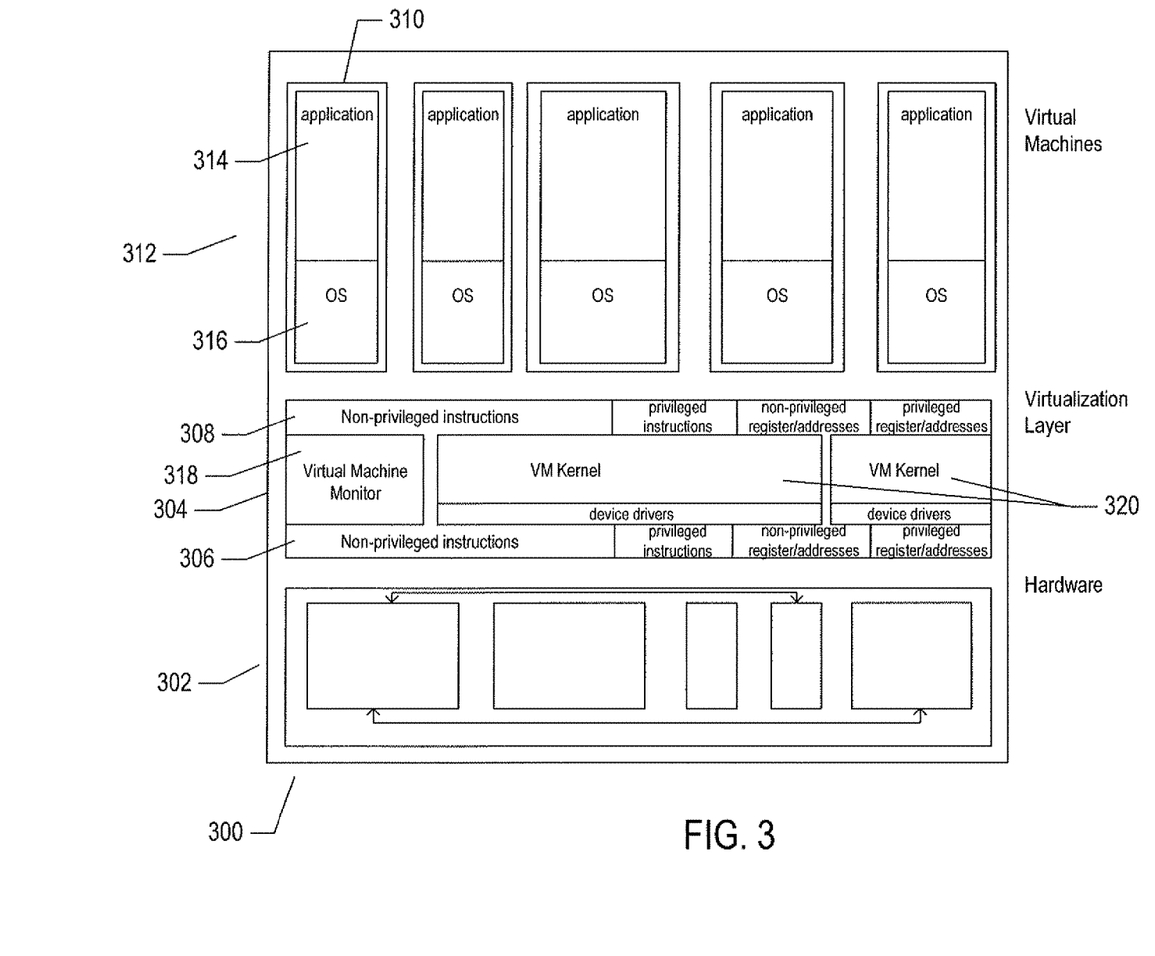
FIG. 3 illustrates one type of virtual machine and virtual-machine execution environment.

For all of these reasons, a higher level of abstraction, referred to as the "virtual machine," has been developed and evolved to further abstract computer hardware in order to address many difficulties and challenges associated with traditional computing systems, including the compatibility issues discussed above. FIG. 3 illustrates one type of virtual machine and virtual-machine execution environment. FIG. 3 uses the same illustration conventions as used in FIG. 1. In particular, the computer system 300 in FIG. 3 includes the same hardware layer 302 as the hardware layer 202 shown in FIG. 2. However, rather than providing an operating system layer directly above the hardware layer, as in FIG. 2, the virtualized computing environment illustrated in FIG. 3 features a virtualization layer 304 that interfaces through a virtualization-layer/hardware-layer interface 306, equivalent to interface 216 in FIG. 2, to the hardware. The virtualization layer provides a hardware-like interface 308 to a number of virtual machines, such as virtual machine 310, executing above the virtualization layer in a virtual-machine layer 312. Each virtual machine includes one or more application programs or other higher-level computational entities packaged together with an operating system, such as application 314 and operating system 316 packaged together within virtual machine 310. Each virtual machine is thus equivalent to the operating-system layer 204 and application-program layer 206 in the general-purpose computer system shown in FIG. 2. Each operating system within a virtual machine interfaces to the virtualization-layer interface 308 rather than to the actual hardware interface 306. The virtualization layer partitions hardware resources into abstract virtual-hardware layers to which each operating system within a virtual machine interfaces. The operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 308 may differ for different operating systems. For example, the virtualization layer is generally able to provide virtual hardware interfaces for a variety of different types of computer hardware. This allows, as one example, a virtual machine that includes an operating system designed for a particular computer architecture to run on hardware of a different architecture. The number of virtual machines need not be equal to the number of physical processors or even a multiple of the number of processors. The virtualization layer includes a virtual-machine-monitor module 318 that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the operating system within a virtual machine accesses virtual privileged instructions, virtual privileged registers, and virtual privileged memory through the virtualization-layer interface 308, the accesses result in execution of virtualization-layer code to simulate or emulate the privileged resources. The virtualization layer additionally includes a kernel module 320 that manages memory, communications, and data-storage machine resources on behalf of executing virtual machines. The kernel, for example, maintains shadow page tables on each virtual machine so that hardware-level virtual-memory facilities can be used to process memory accesses. The kernel additionally includes routines that implement virtual communications and data-storage devices as well as device drivers that directly control the operation of underlying hardware communications and data-storage devices. Similarly, the kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer. There are many alternative virtualization-layer implementations.

Paravirtualized Remote Direct Memory Access

Figure 4A:
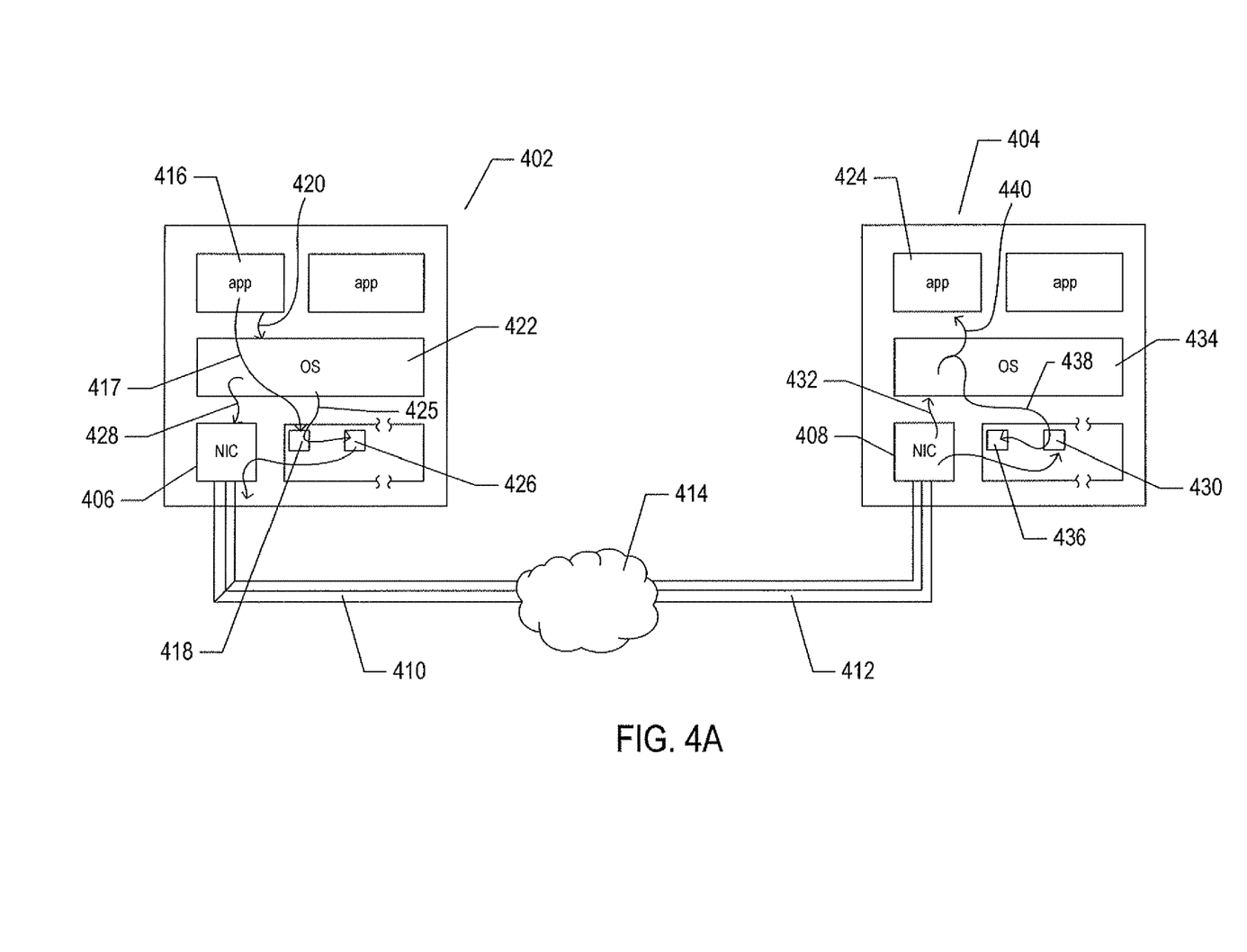
FIGS. 4A-B illustrate remote-direct memory access ("RDMA").
Figure 4B:
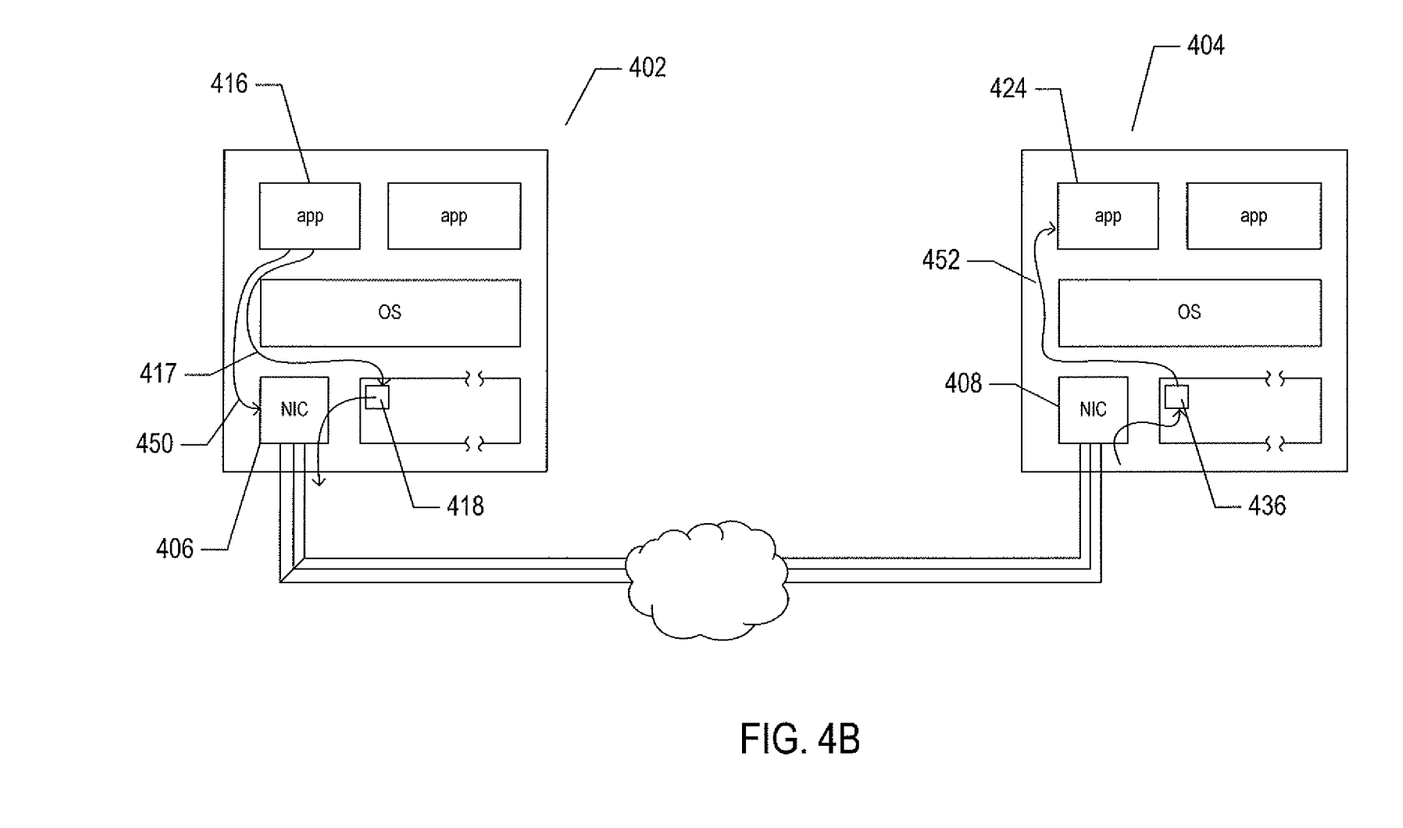

FIGS. 4A-B illustrate remote-direct memory access ("RDMA"). FIG. 4A shows a traditional, operating-system-based method by which a first application executing within a first computer system transfers data to a second application executing within a second, remote computer system. The first computer system 402 is interconnected with the second computer system 404 by an electronic communication subsystem and medium represented, in FIG. 4A, by a network interface card ("NIC") 406 in the first computer, a NIC 408 in the second computer, and the communications media represented by paths 410 and 412 and cloud 414. The two paths 410 and 412 and cloud 414 symbolize any of many different types of communications subsystems and media, including Infiniband®, Ethernet/TCP/IP, iWarp, Remote Direct Memory Access over the Converged Enhanced Ethernet Fabric ("RoCEE"), and other such communications subsystems.

In a first step, the first application 416 writes data 417 into a memory buffer 418 allocated on behalf of the application by the operating system as a result of a previous system call made by the application program. The application then makes a system call 420 to the operating system 422 to initiate transfer of the data from the memory buffer 418 on the first computer system 402 to the second computer system 404. In the call to the operating system, the application provides various addresses and identifiers to the operating system that identify the remote, second computer system 404 and/or a memory buffer allocated to the second application program 424 running on the remote, second computer. The operating system copies 425 data from the applications memory buffer 418 to an operating-system buffer 426 allocated for data transfers to the NIC. The operating system then issues a command 428 to the NIC to transfer data in the memory buffer 426 to the remote computer system. In certain cases, the operating system may generate multiple calls to transfer packet-sized blocks of data. In other cases, the NIC 406 is responsible for packaging the data into packets. In either case, the NIC encapsulates the data into one or more data packets together with address and identifier information and transmits the data through the communications media 410, 412, and 414 to the NIC 408 within the second, remote computer 404. When the NIC 408 in the second computer system 404 receives the data packets, the NIC transfers the data to an operating-system buffer 430 and notifies 432 the operating system 434 in the remote computer system, generally through an interrupt, of the arrival of the data and of the intended recipient. The operating system 434 responds to the interrupt by using the supplied information to determine a memory buffer 436 previously allocated to the remote application 424 to which the data is directed and copies 438 data from the operating system memory buffer 430 to the application memory buffer 436. The operating system then notifies 440 the second application 424 running on the remote computer system 404 that data has been sent to it.

The above description is a simplification of the many steps and activities that transpire during transfer of data from a first application program 416 to the second application program 424. However, even this simplified illustration reveals that the data transfer involves multiple context switches between the application programs and operating systems, memory copies from application buffers to operating-system buffers and from operating-system buffers to application buffers, and multiple system calls and asynchronous notifications. All of these activities add significant latency and computational overhead to the time needed for transfer of the data from the first NIC 406 to the second NIC 408.

FIG. 4B illustrates an example RDMA-facilitated data transfer, in order to contrast the RDMA-facilitated data transfer with the data transfer discussed above with reference to FIG. 4A. In order to carry out RDMA-facilitated data transfer, the first application program 416 writes data to be transferred 417 to the application memory buffer 418. However, rather than making system calls, the application directly interacts, through an RDMA interface that runs in the context of the application program, with the NIC 450 in order to instruct the NIC to read data directly from the application buffer 418 and transfer the data to the NIC 408 in the remote computer system 404. The NIC in the remote computer system then writes the received data to the appropriate application buffer 436. The second application 424 can then access 452 the data in the applications memory buffer 436.

RDMA-facilitated data transfer involves various additional interfaces and connection-setup overheads. However, as can be seen by comparing FIG. 4B to FIG. 4A, RDMA-facilitated data transfer does not involve copying of data between operating-system buffers and application buffers and does not involve context switches between application programs and operating systems as a result of system calls and asynchronous notifications. However, at least in certain types RDMA-facilitated data transfer, the communicating application programs need to poll memory buffers in order to detect arrival of data and, in most types of RDMA-facilitated data transfer, the application memory buffers must be pinned in physical memory so that they are not inadvertently paged out by the operating-system virtual-memory subsystem. Both polling and page pinning may introduce their own latencies and inefficiencies. However, various types RDMA-facilitated data transfer employ a variety of techniques to ameliorate these potential latencies and inefficiencies.

RDMA-facilitated data transfer, discussed above with reference to FIG. 4B, is particularly popular in high-performance-computing ("HPC") contexts, including highly parallel distributed computing systems in which distributed shared memory and inter-process messaging are implemented based on RDMA data transfers. RDMA is also popular in various high-end financial computing systems that monitor and respond to real-time financial-transaction data.

As discussed above, the virtualization-layer abstraction has provided many advantages in computing, including the ability to run applications implemented for various different operating systems within a single system, the ability to migrate executing virtual machines among computer systems within a distributed environment for load balancing and fault tolerance, the ability to snapshot the execution context of application programs, and a variety of additional advantages that are generally unavailable to application programs executing in execution environments provided by operating systems that interface directly with, and control, the hardware resources within computer systems. These advantages provided by virtualization layers would be extremely useful in HPC and financial-computing environments. However, because, to date, virtualization layers do not provide flexible virtualized RDMA facilities, and because of the importance of RDMA data transfer in HPC and financial-computing environments, virtualization technologies have not been embraced in HPC and financial-computing environments to the extent that they have been embraced in many other areas of computing, including cloud computing, data centers, and other computing environments.

Figure 5A:
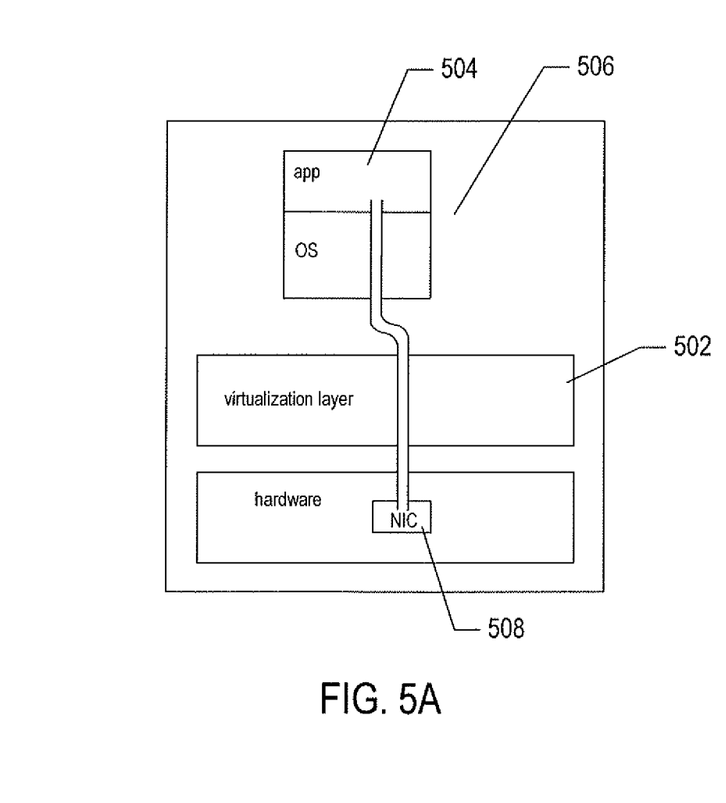
FIGS. 5A-B illustrate several possible implementations of an RDMA facility within a virtualized computing environment.
Figure 5B:
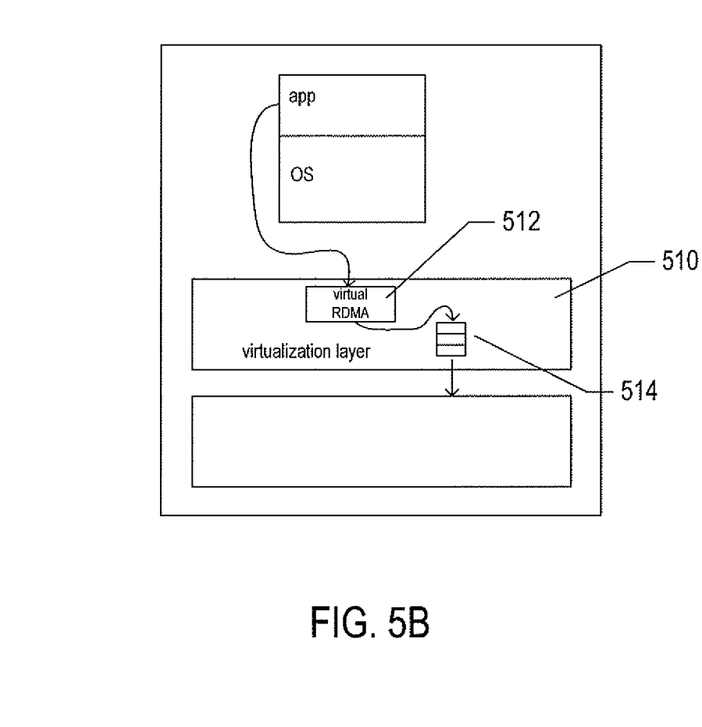

FIGS. 5A-B illustrate several possible implementations of an RDMA facility within a virtualized computing environment. FIG. 5A illustrates a pass-through implementation. In this type of implementation, the virtualization layer 502 provides a pass-through mechanism to allow an application program 504 running within a virtual machine 506 to directly access an RDMA hardware device 508, such as an RDMA-enabled NIC or host adapter. In certain cases, multiple virtual machines may share a single RDMA hardware device through a pass-through mechanism. However, because much of the state information that characterizes the connections and ongoing data transfers between applications running within virtual machines resides within the RDMA hardware device and application program, the virtualization layer and VM kernel cannot access and assemble the state information in order to facilitate VM migration, snapshots of VMs, and to carry out other such virtualization-layer-provided tasks and facilities.

FIG. 5B shows another possible implementation of an RDMA facility for use by application programs running within virtual machines above a virtualization layer. In this implementation, the virtualization layer 510 emulates an RDMA facility 512 using socket-type communications facilities 514 over Ethernet or other types of communications systems. In this implementation, the virtualization layer creates and maintains state information for the various connections and ongoing data transfers carried out by application programs through the virtual RDMA facility 512. However, because the RDMA facility is emulated, many of the inefficiencies and latencies attendant with traditional communications, discussed above with reference to FIG. 4A, also occur as a result of RDMA-facility emulation, including memory copies and context switches.

Figure 6:
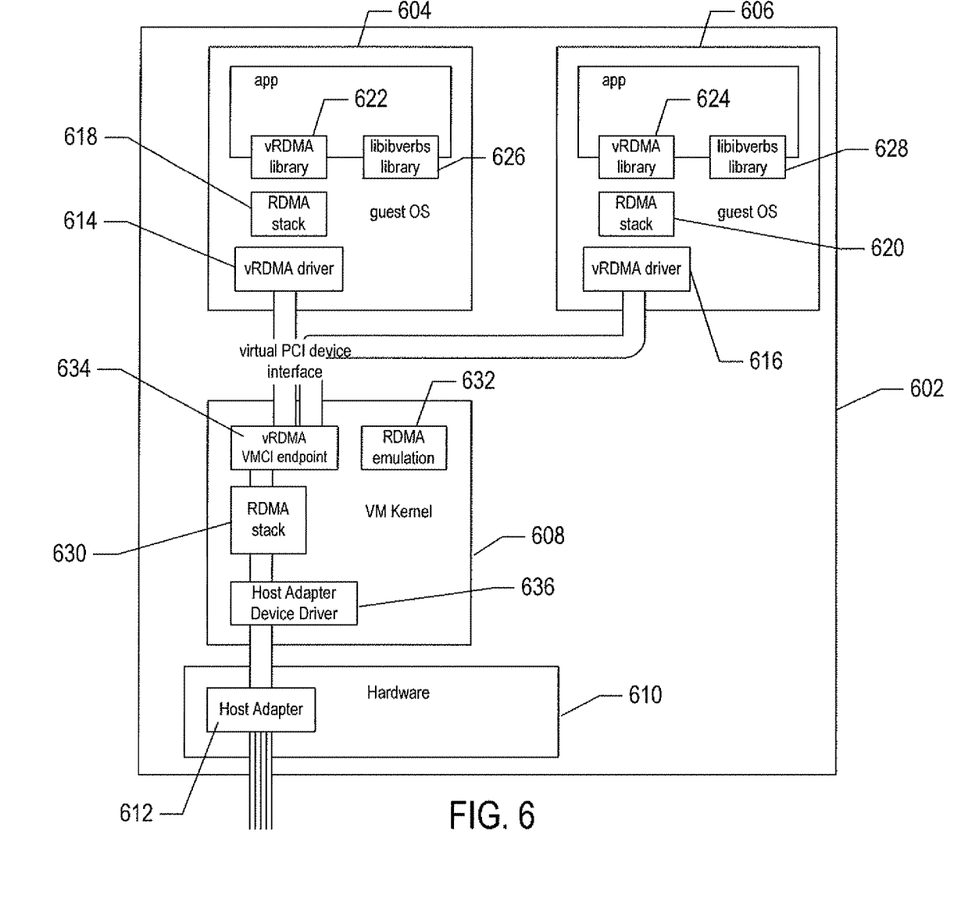
FIG. 6 illustrates the currently disclosed paravirtual RDMA-device-driver implementation.

The current application discloses a different approach to providing RDMA facilities to application programs running within virtual machines above a virtualization layer. In this approach, the virtualization layer provides a paravirtual device driver to guest operating systems. FIG. 6 illustrates the currently disclosed paravirtual RDMA-device-driver implementation. In FIG. 6, a computer system 602 is shown that includes two virtual machines 604 and 606, a VM kernel portion of a virtualization layer 608, and underlying hardware 610 in block-diagram fashion. The hardware layer includes one or more host adaptors 612. The host adaptor is RDMA-enabled and thus provides interfaces that allow processes to directly transfer data via the host adaptor to remote computer systems. Each guest operating system within each virtual machine is supplied with a virtual RDMA ("vRDMA") driver 614 and 616. The vRDMA driver provides a device-driver interface to the low layers of a traditional RDMA stack 618 and 620, such as an Open-Fabrics enterprise distribution ("OFED") RDMA stack. The vRDMA device driver is a Peripheral Component Interconnect ("PCI") driver, and the virtualization layer can arrange for a virtual RDMA device to be detected by the guest operating system during device discovery and to then load and configure the vRDMA device driver during operating-system startup. The RDMA stack, in turn, interfaces to a vRDMA library 622 and 624, a user-space library, which interfaces to an industry-standard libibverbs library 626 and 628 which implement the Verbs application programming interface ("VerbsAPI"). The VerbsAPI provides a set of API calls, referred to as "verbs," that are used by application programs to transfer data and pass datagram messages to other application programs either running within the same machine or running on remote computer systems. The vRDMA driver 614 and 616 registers callback functions with the RDMA stack within the guest OS and passes verbs, or RDMA commands, to the RDMA stack 630 or to a local RDMA emulation module 632 via a virtual machine communication interface ("VMCI") to a vRDMA VMCI endpoint 634 within the VM kernel. The vRDMA driver and vRDMA VMCI endpoint employ the VMCI sockets functionality to pass datagrams. The VM kernel includes a host-adaptor device driver 636 that interacts with a physical host adaptor 612. The lower levels of the RDMA stack 630 within the VM kernel interface to the host-adaptor-device driver 636 in order to carry out RDMA data transfers to remote computer systems. When an application program issues RDMA commands to transfer data to an application program within a different virtual machine running on the same computer system, the RDMA transfers are emulated by the RDMA emulation module 632 using virtualization-layer memory copies. In other words, the RDMA emulation module 632 carries out local RDMA data transfers by copying data from one application buffer to another.

Figure 7:
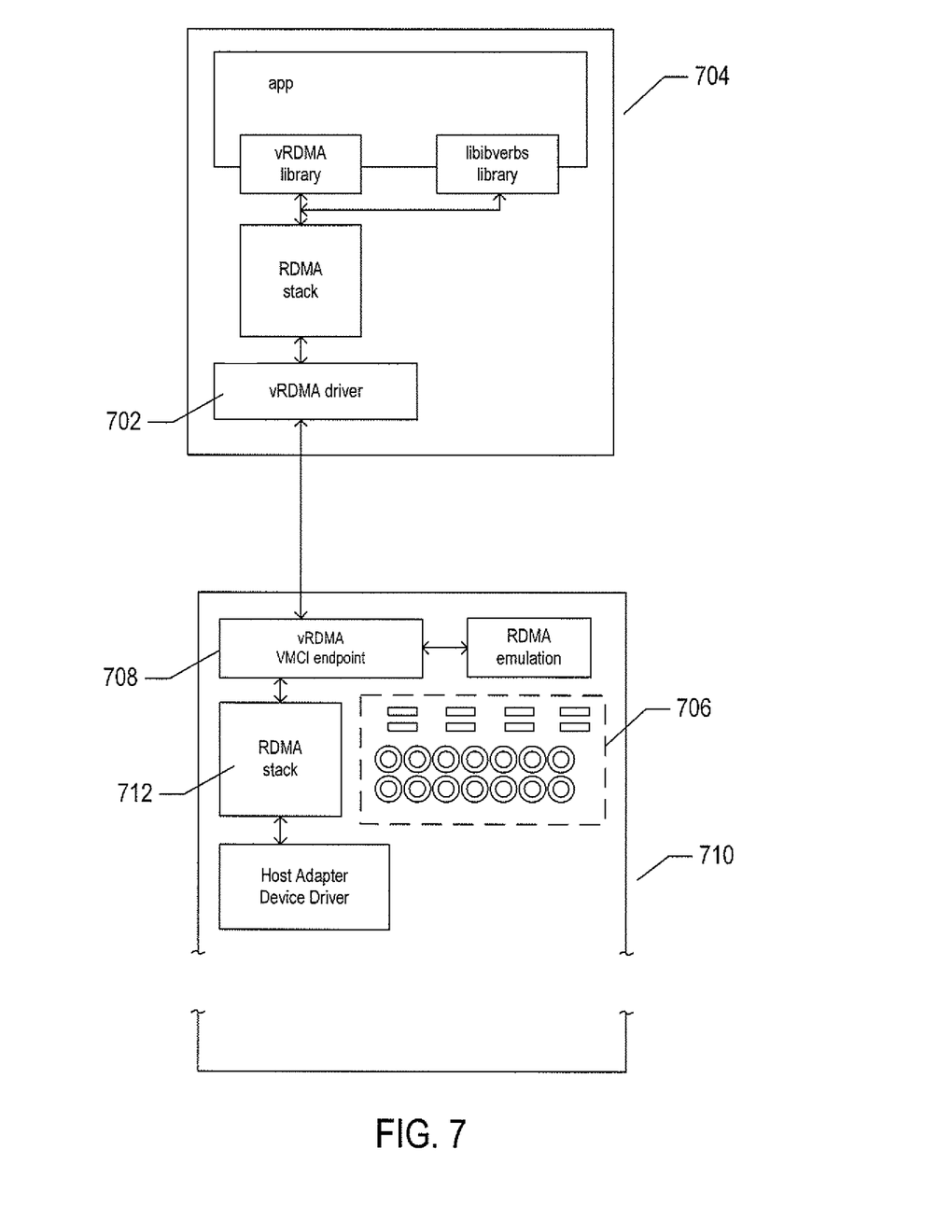
FIG. 7 illustrates additional detail with respect to the vRDMA-driver-based implementation discussed above with reference to FIG. 6.

FIG. 7 illustrates additional detail with respect to the vRDMA-driver-based implementation discussed above with reference to FIG. 6. As shown in FIG. 7, the state information for a vRDMA driver 702 within a virtual machine 704 is distributed between guest-operating-system memory allocated to the guest OS and memory 706 allocated to the VMCI endpoint 708 within the virtualization layer 710. This memory 706 contains queue pairs ("QPs"), completion queues ("CQs") and various memory buffers that are allocated by the RDMA stack 712 within the virtualization layer on behalf of virtual machines 704. These various data structures are used for queuing requests, queuing responses, designating application memory for use in RDMA transfers, receiving completion notifications, and for other such purposes. In addition, the virtualization layer is able to cache data produced by the RDMA stack in response to certain types of RDMA requests so that, when those requests are subsequently made by the same or other virtual machines, the data can be immediately returned from cache rather than through the RDMA-stack interface. Because the state of the vRDMA drivers is stored in guest-operating-system memory and in memory allocated to the virtualization layer, the state of the vRDMA driver of a virtual machine can be checkpointed, stored within an OVF file for virtual-machine migration, and accessed and manipulated for other virtualization-layer-provided operations.

Figure 8A:
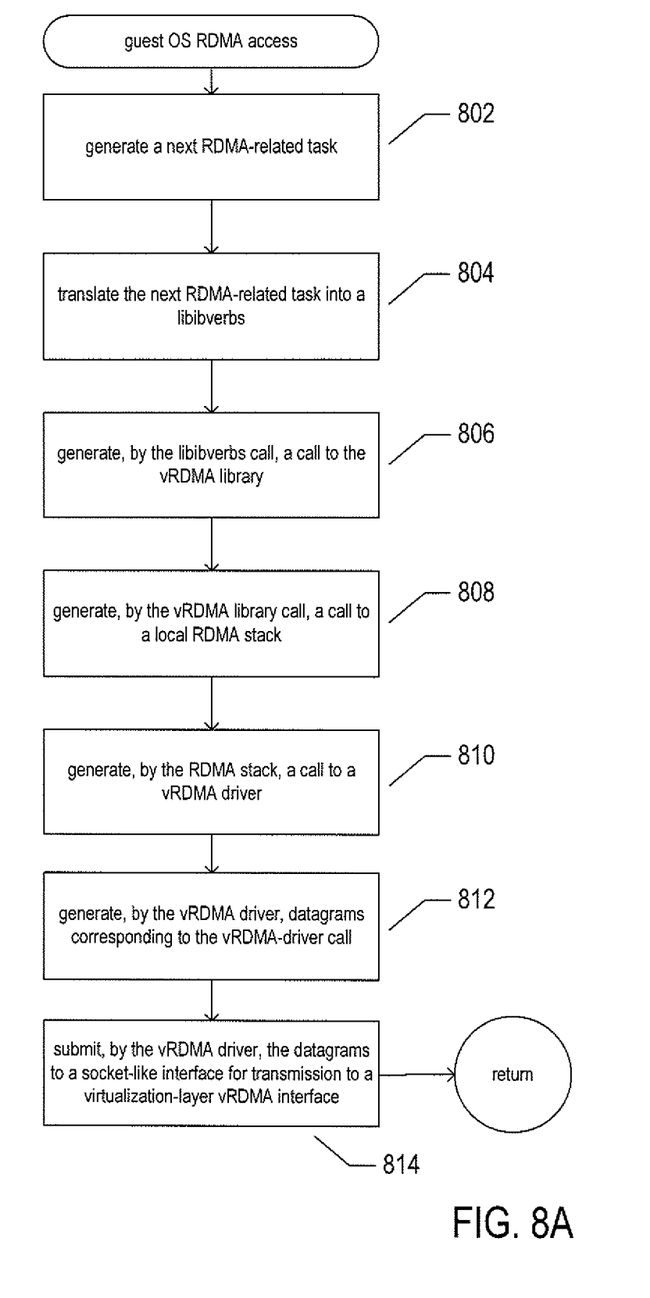
FIGS. 8A-C illustrate operation of the virtualized RDMA facility discussed above with reference to FIGS. 6 and 7.
Figure 8B:
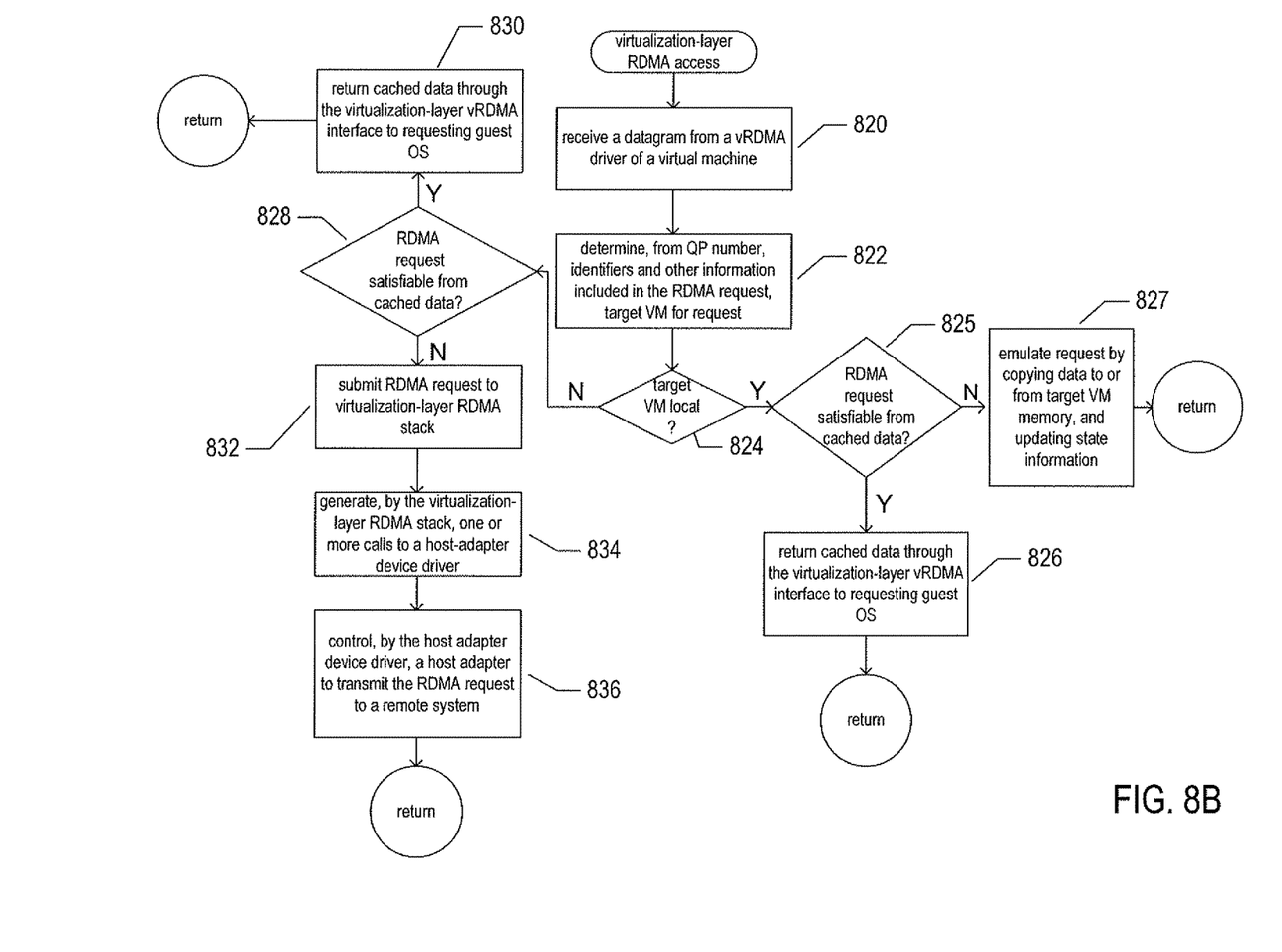
Figure 8C:
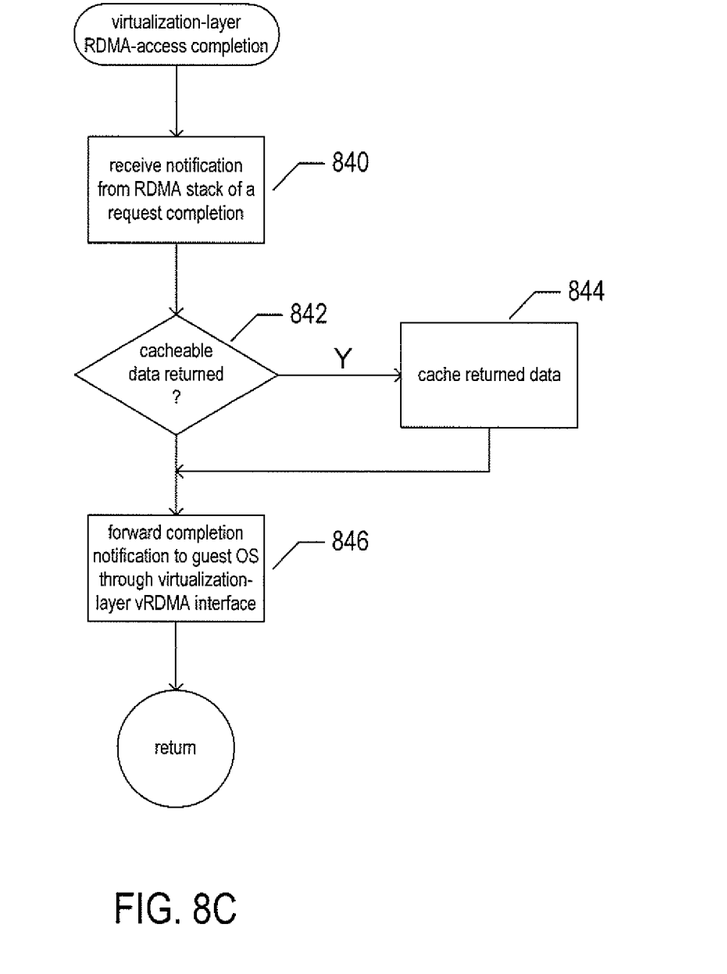

FIGS. 8A-C illustrate operation of the virtualized RDMA facility discussed above with reference to FIGS. 6 and 7. FIG. 8A provides a control-flow diagram illustrating the portion of an RDMA access that occurs within a virtual machine. In step 802, a next RDMA-related task is generated by an application program within a virtual machine. In step 804, the application expresses the task as one or more calls to the libibverbs-library interface. These calls then generate one or more corresponding calls to the vRDMA library, in step 806. The calls to the vRDMA library generate corresponding calls to the local RDMA stack within the guest operating system, in step 808. The RDMA stack, in step 810, generates one or more corresponding calls to the vRDMA driver within the guest operating system. In step 812, the vRDMA driver then generates one or more datagrams that encapsulate the vRDMA-driver calls, which are then transmitted, in step 814, through the VMCI socket interface to the virtualization-layer vRDMA VMCI endpoint.

FIG. 8B illustrates provides a control-flow diagram illustrating the portion of an RDMA access that occurs within the virtualization layer. In step 820, the virtualization layer receives a datagram from a vRDMA driver of a virtual machine through the vRDMA VMCI endpoint. In step 822, the virtualization layer determines, from one or more of a QP number, various identifiers, and/or other information included in the RDMA request and encoded within the datagram, the target virtual machine to which the request is directed. When the target virtual machine is local, as determined in step 824, the virtualization layer determines, in step 825, whether or not the RDMA request can be satisfied from cached data. When the RDMA request can be satisfied from cached data, then, in step 826, the cached data is used to construct an RDMA response that is returned to the requesting guest operating system. Otherwise, the virtualization emulates the request, in step 827 by copying data to or from the target virtual machine memory and updating state information for the vRDMA drivers of both virtual machines. When the target virtual machine is remote, as determined in step 824, the virtualization layer, in step 828, determines whether or not the RDMA request can be satisfied from cached data. When the RDMA request can be satisfied from cached data, then, in step 830, the appropriate cached data is returned by the virtualization layer to the vRDMA driver of the requesting guest operating system. Otherwise, in step 832, the virtualization layer submits an appropriate RDMA request to the virtualization-layer RDMA stack which, in step 834, generates one or more calls to a host-adapter device driver that, in step 836, controls a hardware host adaptor to transmit the RDMA request to a remote virtual machine running on a remote computer system.

FIG. 8C illustrates completion of an RDMA access by the virtualization layer. In step 840, the virtualization layer receives notification from the RDMA stack within the virtualization layer of a request completion. When the request completion involves return of cacheable data, as determined in step 842, then, in step 844, the returned data is cached within the virtualization layer. In step 846, the completion notification is forwarded by the virtualization layer through the VMCI endpoint to the vRDMA device driver in a guest OS of the target virtual machine for the RDMA access. When the guest vRDMA driver receives a datagram from the VMCI endpoint, the guest vRDMA driver determine to which application a corresponding completion notification is to be directed based on an application identifier included in the datagram.

Because the RDMA stacks in virtual machines interface to the virtual RDMA driver within the guest operating systems of the virtual machines, and because the virtual RDMA drivers generate generic RDMA requests, the virtualized RDMA facility can be implemented above any of various different types of host adaptors in corresponding communications media. Thus, the virtualization can multiplex RDMA requests from multiple virtual machines among multiple host adapters and NICs that transmit data over various different types of communications systems. The translation of generic RDMA requests to specific interactions with the host adapters and NICs is carried out by the virtualization layer.

Although the present invention has been described in terms of particular embodiments, it is not intended that the invention be limited to these embodiments. Modifications within the spirit of the invention will be apparent to those skilled in the art. For example, the virtualized RDMA facility can be implemented in many different ways by varying any of many different design and implementation parameters, including modular organization, control structures, data structures, programming languages, local data-transfer mechanisms, and other such design and implementation parameters.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A paravirtual Remote-Direct-Memory-Access ("RDMA") device within a computer system having one or more processors, one or more memories, a virtualization layer that provides a virtual hardware execution environment, and one or more virtual machines, each including an application program and a guest operating system, that execute within the virtual hardware execution environment, the paravirtual RDMA device comprising:
   a virtual RDMA driver, stored as computer instructions within one or more of the one or more memories and executed by one or more of the one or more processors, that executes within a context of a guest operating system within a virtual machine;
   a virtual RDMA endpoint, stored as computer instructions within one or more of the one or more memories and executed by one or more of the one or more processors, that executes within a context of the virtualization layer;
   a communications medium that interconnects the virtual RDMA driver with the virtual RDMA endpoint; and
   a host adapter through which the virtualization layer transmits RDMA requests and data, received through the RDMA endpoint, to remote computer systems and receives RDMA requests and data that are forwarded through the RDMA endpoint to the virtual RDMA driver.

2. The paravirtual RDMA device of claim 1 wherein the communications medium is implemented using Virtual-Machine-Communications-Interface ("VMCI") sockets.

3. The paravirtual RDMA device of claim 1 further comprising:
   an RDMA stack, executing within the context of the guest operating system, that interfaces to the virtual RDMA driver; and
   an RDMA stack, executing within the context of the virtualization layer, that interfaces to a host-adapter device driver executing within the context of the virtualization layer, the host-adapter device driver, in turn, interfacing to the host adapter.

4. The paravirtual RDMA device of claim 3 wherein the RDMA stacks are OpenFabrics enterprise distribution RDMA stacks.

5. The paravirtual RDMA device of claim 3 further comprising:
   a virtual RDMA user-space library; and
   a libibverbs library to which the virtual RDMA user-space library interfaces, the libibverbs library implementing a Verbs application programming interface that provides a set of API calls, to application programs, that transfer data and pass datagram messages to other application programs.

6. The paravirtual RDMA device of claim 5
   wherein the virtual RDMA driver registers callback functions with the RDMA stack executing within the context of the guest operating system; and
   wherein the virtual RDMA driver passes verbs, or RDMA commands, to the RDMA stack executing within the context of the guest operating system.

7. The paravirtual RDMA device of claim 1 further including state information distributed between guest-operating-system memory allocated to the guest operating system and memory allocated to the virtual RDMA endpoint within the virtualization layer.

8. The paravirtual RDMA device of claim 7 wherein the state information includes:
   queue pairs;
   completion queues; and
   memory buffers that are allocated by the RDMA stack executing in the context of the virtualization layer.

9. The paravirtual RDMA device of claim 1 further including one or more data caches that cache data produced by the RDMA stack executing in the context of the virtualization layer in response to certain types of RDMA requests so that, when those requests are again subsequently received, the data can be immediately returned from the data cache rather than through the RDMA-stack interface.

10. The paravirtual RDMA device of claim 1 wherein RDMA requests received by the virtual RDMA endpoint that are directed to application programs running in remote computer systems are directed to the RDMA stack executing in the context of the virtualization layer and RDMA requests received by the virtual RDMA endpoint that are directed to application programs running in the computer system are directed to an RDMA emulation module that employs virtualization-layer memory copies to transfer the requests.

11. A method for providing RDMA functionality to an application program executing in the execution environment provided by a guest operating system within a virtual machine that, in turn, executes within a virtual hardware execution environment provided by a virtualization layer that executes within a computer system having one or more processors and one or more memories, the method comprising:
   providing a virtual RDMA driver by storing computer instructions within one or more of the one or more memories and executing, by one or more of the one or more processors, the computer instructions that encode the virtual RDMA driver within a context of the guest operating system;

providing a virtual RDMA endpoint by storing computer instructions within one or more of the one or more memories and executing, by one or more of the one or more processors, the computer instructions that encode the virtual RDMA endpoint within a context of the virtualization layer;

providing an interconnection between the virtual RDMA driver and the virtual RDMA endpoint;

forwarding RDMA requests received from the virtual RDMA driver through the virtual RDMA endpoint to one of
- an RDMA stack, executing in the context of the virtualization layer, that interfaces to a host adapter, and
- an RDMA emulation module; and forwarding responses to RDMA requests from the RDMA stack executing in the context of the virtualization layer and from the RDMA emulation module through the virtual RDMA endpoint to the virtual RDMA driver.

12. The method of claim 11 wherein the interconnection between the virtual RDMA driver and the virtual RDMA endpoint is implemented using VMCI sockets.

13. The method of claim 11 further comprising providing an RDMA stack, executing within the context of the guest operating system, that interfaces to the virtual RDMA driver.

14. The method of claim 13 wherein the RDMA stacks are OpenFabrics enterprise distribution RDMA stacks.

15. The method of claim 13 further comprising providing:
a virtual RDMA user-space library; and
a libibverbs library to which the virtual RDMA user-space library interfaces, the libibverbs library implementing a Verbs application programming interface that provides a set of API calls, to application programs, that transfer data and pass datagram messages to other application programs.

16. The method of claim 15 further comprising:
registering, by the virtual RDMA driver, callback functions with the RDMA stack executing within the context of the guest operating system; and
passing verbs, or RDMA commands, by the virtual RDMA driver to the RDMA stack executing within the context of the guest operating system.

17. The method of claim 11 further including storing state information in a distributed fashion between guest-operating-system memory allocated to the guest operating system and memory allocated to the virtual RDMA endpoint within the virtualization layer.

18. The method of claim 17 wherein the state information includes:
queue pairs;
completion queues; and
memory buffers that are allocated by the RDMA stack executing in the context of the virtualization layer.

19. The method of claim 11 further including:
caching, in one or more data caches, data produced by the RDMA stack executing in the context of the virtualization layer in response to certain types of RDMA requests so that, when those requests are again subsequently received, the data can be immediately returned from the data cache rather than through the RDMA-stack interface.

20. The method of claim 11 further including:
directing RDMA requests, received by the virtual RDMA endpoint, that are directed to application programs running in remote computer systems to the RDMA stack executing in the context of the virtualization layer; and
directing RDMA requests, received by the virtual RDMA endpoint, that are directed to application programs running in the computer system to the RDMA emulation module that employs virtualization-layer memory copies to transfer the requests.

* * * * *